US008792883B2

(12) United States Patent
Ma et al.

(10) Patent No.: US 8,792,883 B2
(45) Date of Patent: Jul. 29, 2014

(54) INTEGRATION OF ROAMING AND NON-ROAMING MESSAGE PROCESSING

(75) Inventors: Haiqing H. Ma, Nepean (CA); Lui Chu Yeung, Kanata (CA); Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 365 days.

(21) Appl. No.: 13/275,490

(22) Filed: Oct. 18, 2011

(65) Prior Publication Data
US 2013/0095824 A1 Apr. 18, 2013

(51) Int. Cl.
*H04W 4/00* (2009.01)
*H04W 8/02* (2009.01)
*H04W 8/04* (2009.01)
*H04W 8/08* (2009.01)

(52) U.S. Cl.
CPC *H04W 8/02* (2013.01); *H04W 8/04* (2013.01); *H04W 8/08* (2013.01)
USPC ............ 455/432.2; 455/433; 455/432.1; 455/432.3

(58) Field of Classification Search
CPC .......... H04W 8/02; H04W 8/04; H04W 8/06; H04W 8/12; H04W 8/18; H04W 4/20; H04W 12/06
USPC ......... 455/433, 432.1, 432.2, 432.3; 709/203, 709/206, 227, 245; 703/203, 206, 227, 245
See application file for complete search history.

(56) References Cited

U.S. PATENT DOCUMENTS

| | | | |
|---|---|---|---|
| 2001/0016492 A1* | 8/2001 | Igarashi et al. ............... | 455/433 |
| 2006/0242322 A1* | 10/2006 | Williams et al. .............. | 709/245 |
| 2006/0262725 A1* | 11/2006 | Barrett .......................... | 370/235 |
| 2011/0081907 A1* | 4/2011 | Yang et al. .................... | 455/433 |
| 2012/0155389 A1* | 6/2012 | McNamee et al. ............ | 370/328 |
| 2013/0031615 A1* | 1/2013 | Woodward et al. ............... | 726/4 |

OTHER PUBLICATIONS

3GPP TS 29.215 V8.3.0 (Sep. 2009) available at 3GPP website link http://www.3gpp.org/DynaReport/29215.htm (Document title 3rd Generation Partnership Project; Technical Specification Group Core Network and Terminals; Policy and Charging Control (PCC) over S9 reference point; (Stage 3) Release 8).*

* cited by examiner

*Primary Examiner* — Manpreet Matharu
(74) *Attorney, Agent, or Firm* — Kramer Amado P.C.

(57) ABSTRACT

Various exemplary embodiments relate to a method and related network node including one or more of the following: receiving a message at the network device from a partner device; translating the message to generate a translated message formed according to a non-roaming protocol; processing the translated message to generate a response message; translating the response message to generate a translated response message formed according to a roaming protocol; transmitting the response message by the network device to the partner device.

20 Claims, 5 Drawing Sheets

INTEGRATION OF ROAMING AND NON-ROAMING MESSAGE PROCESSING

RELATED APPLICATIONS

This application cross-references the following co-pending application, incorporated by reference herein, in its entirety: application Ser. No. 13/275,515, "DIAMETER SESSION AUDITS" to Mann et al.; and application Ser. No. 13/275,647, "PCRN SESSION ARCHITECTURE FOR ROAMING" to Mann et al.

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP has also recommended various procedures for providing roaming access to various users. 3GPP TS 29.215 provides that a visited PCRF may communicate, via an S9 session, with an attached user's home PCRF. Over this S9 session, the visited PCRF may retrieve information useful in providing data flows requested by a user.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for integrating processing of roaming messages and non-roaming messages, the method including one or more of the following: receiving a message at the network device from a partner device; translating the message to generate a translated message formed according to a non-roaming protocol; processing the translated message to generate a response message; translating the response message to generate a translated response message formed according to a roaming protocol; and transmitting the response message by the network device to the partner device.

Various exemplary embodiments relate to a network device for integrating processing of roaming messages and non-roaming messages, the network device including one or more of the following: an interface that receives a message from a partner device; a roaming message translator configured to translate the message to generate a translated message formed according to a non-roaming protocol; a non-roaming message processor configured to process the translated message to generate a response message; a non-roaming message translator configured to translate the response message to generate a translated response message formed according to a roaming protocol; and a roaming message processor configured to transmit the response message to the partner device.

Various exemplary embodiments relate to a tangible and non-transitory machine-readable storage medium encoded with instructions for execution by a network device for integrating processing of roaming messages and non-roaming messages, the tangible and non-transitory machine-readable storage medium including one or more of the following: instructions for receiving a message at the network device from a partner device; instructions for translating the message to generate a translated message formed according to a non-roaming protocol; instructions for processing the translated message to generate a response message; instructions for translating the response message to generate a translated response message formed according to a roaming protocol; and instructions for transmitting the response message by the network device to the partner device.

Various embodiments are described wherein the roaming protocol is an S9 Diameter protocol and the non-roaming protocol is at least one of a Gx Diameter protocol and a Gxx Diameter protocol.

Various embodiments are described wherein the step of translating the message includes: extracting a value from a first attribute-value pair (AVP) included in the message; generating a second AVP including the extracted value, wherein the second AVP is of a different type from the first AVP; and including the second AVP in the translated message.

Various embodiments are described wherein the message includes a subsession attribute-value pair (AVP) and the step of translating the message includes: extracting a first AVP included in the subsession AVP; extracting a second AVP included in the message outside of the subsession AVP; and including the first AVP and the second AVP in the translated message.

Various embodiments are described wherein the message includes a first subsession attribute-value pair (AVP) and a second subsession AVP, and the translated message is generated based on the first subsession AVP, the method further includes: translating the message to generate a second translated message formed according to a non-roaming protocol and based on the second subsession AVP; and processing the second translated message to generate a second response message.

Various embodiments are described wherein the translated message corresponds to a virtual IP-CAN session, and the step of processing the translated message includes: attempting to transmit the response message based on an IP-CAN session record associated with the virtual IP-CAN session, wherein the IP-CAN session record indicates that the network device should transmit the response to itself.

Various embodiments are described wherein the step of translating the response message includes: generating a first subsession attribute-value pair (AVP) based on the response message; generating a second subsession AVP based on a second response message; and generating a translated response message including the first subsession AVP and the second subsession AVP.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
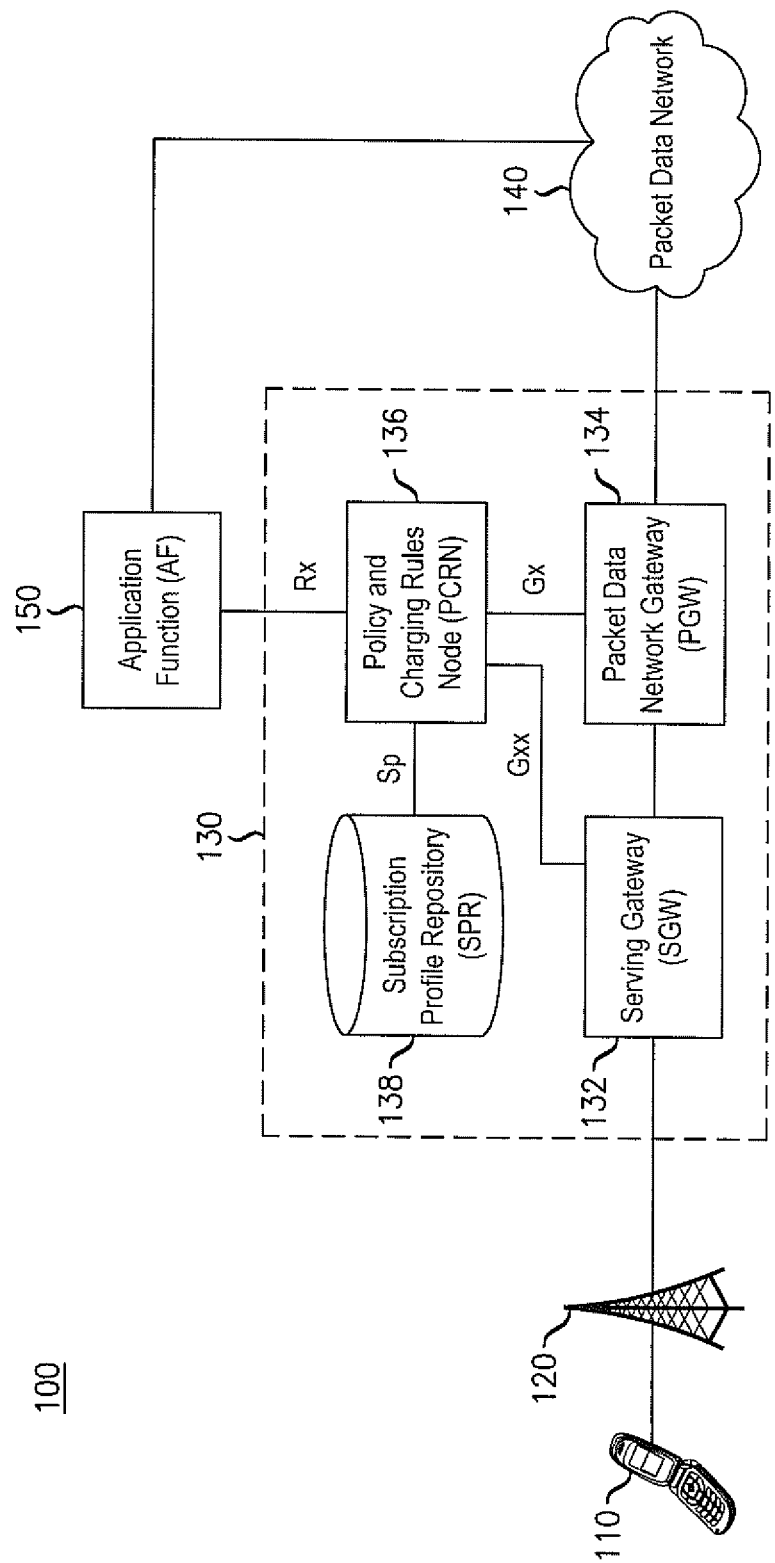
FIG. 1 illustrates an exemplary subscriber network for providing various data services.

While S9 Diameter messages often carry similar data to Gx and/or Gxx message and often elicit similar responses, the S9 protocol is not identical to the Gx and Gxx protocols. As such, while the underlying request may be the same as a request expected according to the Gx or Gxx interface, the format of the message may be very different. Accordingly, S9 messages may require different and/or additional processing to achieve a similar result to that which would be achieved in regard to a similar Gx or Gxx message.

For example, 3GPP TS 29.215 indicates that in various circumstances, an S9 credit control answer (CCA) should include an Experimental-Result-Code attribute value pair (AVP) while a similar Gx or Gxx CCA should instead include an Experimental-Result AVP. While these AVPs convey similar information, they are not identical. As such, a policy and charging rules node (PCRN) may need to differentiate between S9 and Gx/Gxx messages to ensure proper processing of each.

In view of the foregoing, it would be desirable to provide an integrated method of processing S9, Gx, and Gxx messages. In particular, it would be desirable to provide a method of reusing modules and structures already developed for processing Gx/Gxx messages for the purpose of processing similar S9 messages.

Referring now to the drawings, in which like numerals refer to like components or steps, there are disclosed broad aspects of various exemplary embodiments.

FIG. 1 illustrates an exemplary subscriber network 100 for providing various data services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
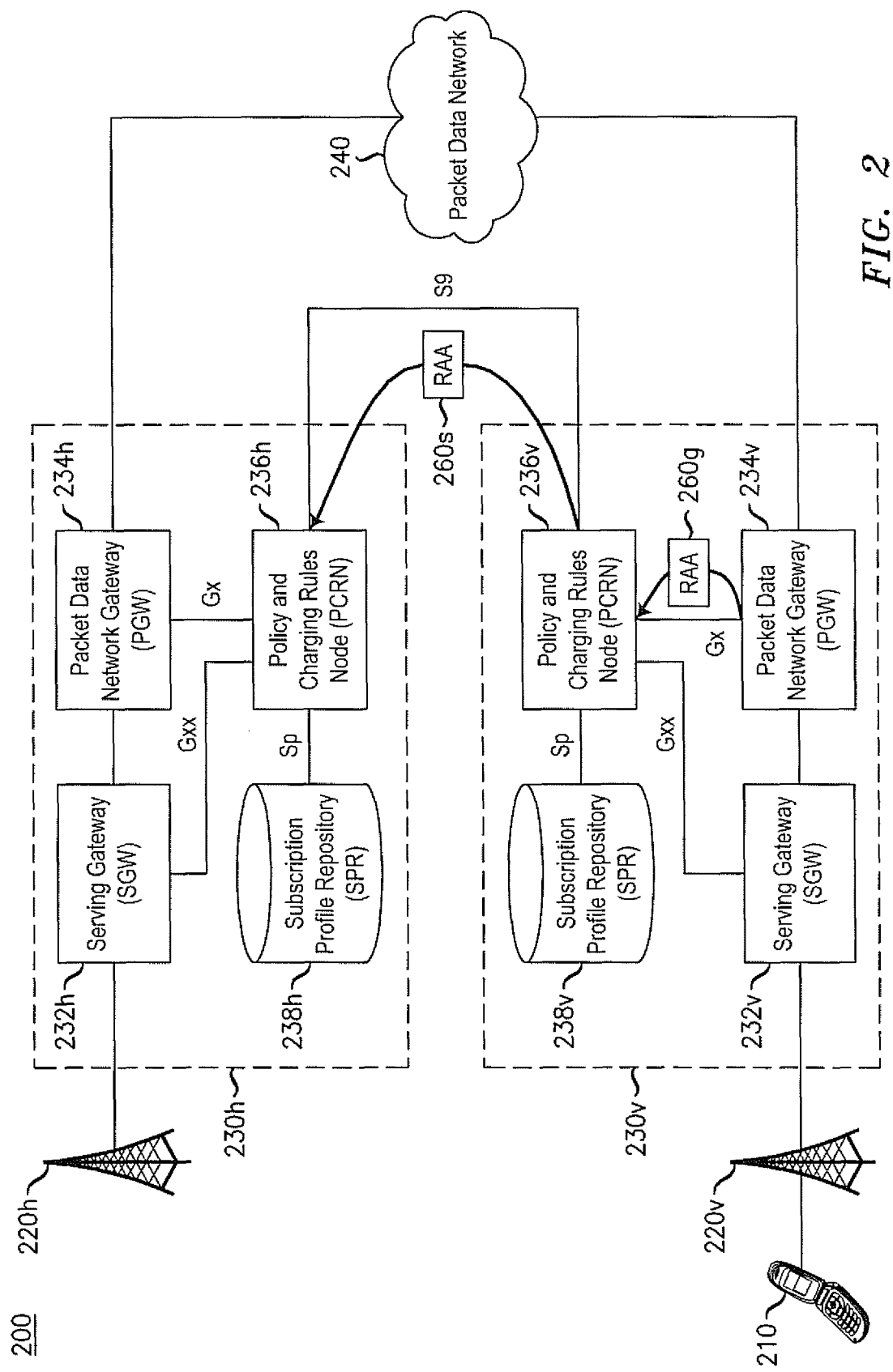
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. In various embodiments, EPC 230v and EPC 230h may connect to the same packet data network 240 (as shown) or may connect to two independent networks. Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) with respect to the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via an S9 session.

In various embodiments, PCRN 236v may forward requests associated with UE 210 to PCRN 236h via an S9 session. PCRN 236h may process these messages to, for example, generate PCC and/or QoS rules. PCRN 236h may then forward these rules to PCRN 236v for installation on PGW 234v and/or SGW 232v. In the case of home-routed access, PCRN 236h may also install PCC rules directly on PGW 234h. In view of the cooperative nature of PCRNs 236h, 236v, these devices may be referred to as "partner devices" with respect to each other. Similarly, PCRN 236v may also forward various answer messages received from other nodes to PCRN 236h. Further, PCRN 236h may push various messages to PCRN 236v based on direct communications from other nodes, such as an AF or other auxiliary node.

While PCRNs 236v, 236h may be described as "forwarding" various messages to each other received from other devices, it will be understood that the actual message sent over the S9 interface may differ from the message received. In particular, while a Gx or Gxx message may be received, the PCRN 236h, 236v may forward an S9 message including similar information. As an example, FIG. 2 illustrates PGW 234v transmitting an RAA 260g to PCRN 236v. RAA 260g may be transmitted in response to a RAR previously received by PGW 234v to indicate that a PCC rule failed to install. Because the RAA 260g is transmitted via the Gx interface, RAA 260g may be formed according to the Gx protocol. Because RAA 260g is associated with a roaming session, however, PCRN 236v may determine that the information contained in RAA 260g should be communicated to the home PCRN 236h for appropriate handling. Accordingly, PCRN 236v may construct and transmit an RAA 260s to PCRN 236h. RAA 260s may be formed according to the S9 protocol but contain similar information, namely information indicating a PCC rule installation failure.

Upon receiving RAA 260s, PCRN 236h may process the message. While the received RAA 260s is an S9 message, the appropriate action may be the same or similar to the appropriate action had the Gx RAA 260g been received directly from PGW 234v. To enable the use of modules that already exist to process Gx and Gxx messages, PCRN 236h may first internally translate the S9 RAA 260s into a Gx RAA (not shown) The internal Gx RAA (not shown) may be similar or identical to Gx RAA 260g. After this translation, PCRN 236h may process the message as it would any other Gx RAA. If processing of such a message normally includes generating a Gx and/or Gxx response, PCRN 236h may first translate the Gx and/or Gxx response into an S9 response for transmission to PCRN 236v.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

Figure 3:
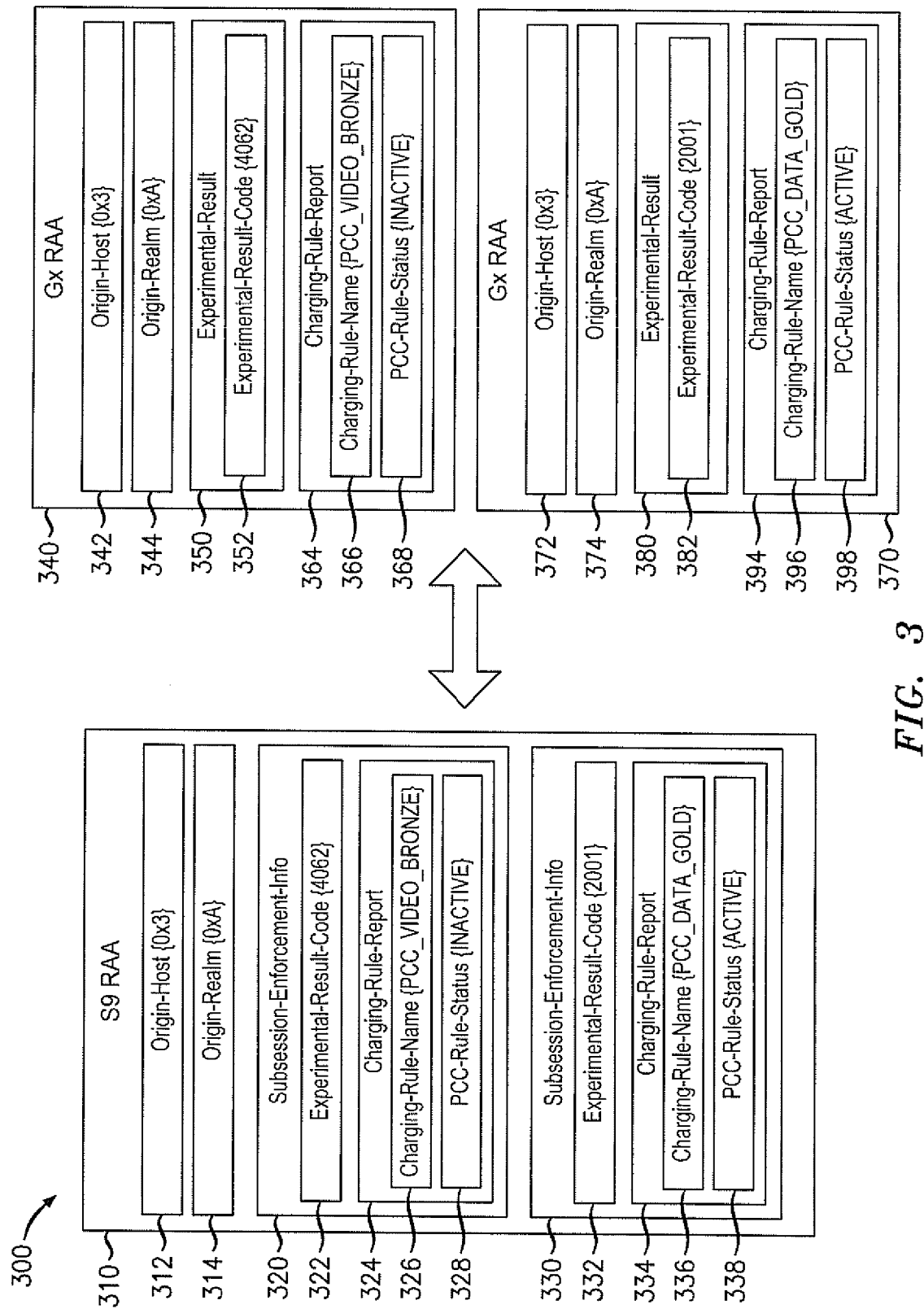
FIG. 3 illustrates an exemplary message translation from S9 protocol to Gx protocol.

FIG. 3 illustrates an exemplary message translation 300 from S9 protocol to Gx protocol. Message translation 300 may be performed by a PCRN such as PCRNs 136, 236h, and/or 236v. For example, the PCRN may convert an S9 RAA 310 into one or more Gx RAAs 340,370. Accordingly, S9 RAA 310 may correspond to S9 RAA 260s of FIG. 2.

S9 RAA 310 may be formed according to the S9 protocol. Because the S9 protocol may be used in communications between PCRNs to provide roaming support, the S9 protocol may be referred to as a "roaming protocol." Various other protocols may additionally or alternatively serve as roaming protocols, as will be apparent to those of skill in the art. S9 RAA 310 may include a number of AVPs such as Origin-Host SVP 312 and Origin-Realm AVP 314. S9 RAA 310 may include numerous additional AVPs (not shown).

S9 RAA 310 may include information associated with multiple S9 subsessions. Accordingly, S9 RAA 310 may include a subsession AVP for each such S9 subsession. In the example of S9 RAA 310, there are two subsession AVPs: Subsession-Enforcement-Info AVPs 320, 330. It will be apparent to those of skill in the art that various alternative messages may include different subsession AVPs. For example, an alternative message may include Subsession-Decision-Info AVPs instead.

Subsession-Enforcement-Info 320 may include additional AVPs such as Experimental-Result-Code AVP 322 and Charging-Rule-Report AVP 324. Charging-Rule-Report AVP 324, in turn, may include Charging-Rule-Name AVP 326 and PCC-Rule-Status AVP 328. Taken together, Subsession-Enforcement-Info AVP 320 may indicate a result code of 4062 and that a PCC rule named PCC_VIDEO_BRONZE failed to install. Subsession-Enforcement-Info AVP 330 may similarly include Experimental-Result-Code AVP 332 and Charging-Rule-Report AVP 334 which, in turn, may include Charging-Rule-Name AVP 336 and PCC-Rule-Status AVP 338. Taken together, Subsession-Enforcement-Info AVP 330 may indicate a result code of 2001 and that a PCC rule named PCC_DATA_GOLD was successfully installed.

Gx RAAs 340, 370 may together carry information similar to that carried by S9 RAA 310. Gx RAAs 340,370 may both be implemented according to the Gx protocol. Because the Gx protocol may be used for communications between a PGW and PCRN within the same network, Gx protocol may be referred to as a "non-roaming protocol." Various other protocols such as Gxx may additionally or alternatively act as non-roaming protocols, as will be apparent to those of skill in the art.

In various embodiments, a PCRN may process each subsession separately. Accordingly, the PCRN may translate an S9 message into multiple Gx and/or Gxx messages. In the example of translation 300, Gx RAA 340 may be based on Subsession-Enforcement-Info AVP 320 while Gx RAA 370 may be based on Subsession-Enforcement-Info AVP 330. Accordingly, Gx RAA 340 may indicate a result code of 4062 and that a PCC rule named PCC_VIDEO_BRONZE failed to install. Likewise, Gx RAA 370 may indicate a result code of 2001 and that a PCC rule named PCC_DATA_GOLD was successfully installed. The form of these messages, however, may be different from that of S9 RAA 310.

For example, Gx RAA 340 may include Origin-Host AVP 342 and Origin-Realm AVP 344 while Gx RAA 370 may include Origin-Host AVP 372 and Origin-Realm AVP 374. The similar AVPs 312, 314 of S9 RAA 310 may be located at the session level of the message, outside of any subsession AVPs such as Subsession-Enforcement-Info AVPS 320, 330. Accordingly, while Gx RAAs 340, 370 may correspond to subsession level information, they may also include information carried at the session level of the corresponding S9 RAA message 310.

As another example, Gx RAA 340 may include an Experimental-Result-Code AVP 352 and Gx RAA 370 may include an Experimental-Result-Code AVP 382. These AVPs may correspond to Experimental-Result-Code AVPs 322, 332 of S9 RAA 310, respectively. However, per the Gx protocol and unlike the S9 RAA 310, the Experimental-Result-Code AVPs 352, 382 may be included within Experimental-Result AVPs 350, 380, respectively.

As a final example, Charging-Rule-Report AVPs 364, 389 may be copied from within Subsession-Enforcement-Info AVPs 320, 330, respectively, into Gx RAAs 340, 370, respectively. Charging-Rule-Report AVPs 364, 394 may also include Charging-Rule-Name AVPs 366, 396, respectively, and PCC-Rule-Status AVPs 368, 398, respectively. Various additional or alternative translations of information between the S9, Gx, and Gxx protocols will be apparent to those of skill in the art.

Figures 4, 5:
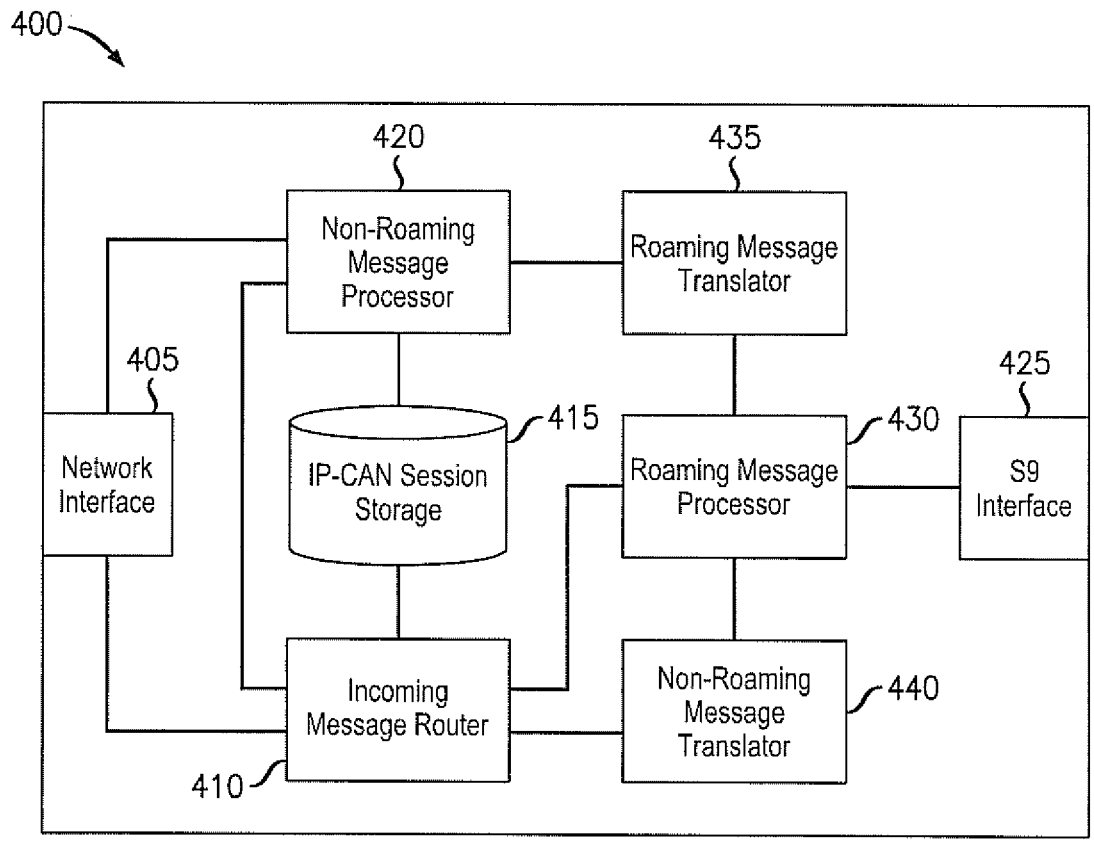
FIG. 4 illustrates an exemplary policy and charging rules node (PCRN) for integrating S9 and Gx/Gxx processing.
FIG. 5 illustrates an exemplary data arrangement for storing IP-CAN session records.

FIG. 4 illustrates an exemplary policy and charging rules node (PCRN) 400 for integrating S9 and Gx/Gxx processing. PCRN 400 may correspond to one or more of PCRNs 136, 236h, and 236v. PCRN 400 may include network interface 405, incoming message router 410, IP-CAN session storage 415, non-roaming message processor 420, S9 interface 425, roaming message processor 430, roaming message translator 435, and/or non-roaming message translator 440.

Network interface 405 may be an interface comprising hardware and/or executable instructions encoded on a machine-readable storage medium configured to communicate with at least one other device such as, for example, a PGW and/or AF. Accordingly, network interface 405 may include a Gx, Gxx, and/or Rx interface. In various embodiments, network interface 405 may be an Ethernet interface.

Incoming message router 410 may include hardware and/or executable instructions on a machine-readable storage medium configured to forward incoming messages received via network interface 405 to an appropriate module for further processing. For each message, incoming message router 410 may refer to IP-CAN session storage 415 and/or another storage (not shown) such as a subscription record storage to determine whether the message is associated with a non-roaming session. For example, if the message is associated with a subscriber for which PCRN 400 is in an HPLMN, incoming message router 410 may forward the message to non-roaming message processor 420. On the other hand, if the associated subscriber is associated with a different HPLMN, incoming message router 410 may forward the message to roaming message processor 430. As will be described in greater detail below, incoming message router 410 may also be configured to recognize some special circumstances and take alternative action in response. For example, upon receiving a Gx/Gxx CCR or RAA message, incoming message router 410 may forward the message to non-roaming message translator 440.

IP-CAN session storage 415 may be any machine-readable medium capable of storing information related to various IP-CAN sessions. Accordingly, IP-CAN session storage 415 may include a machine-readable storage medium such as read-only memory (ROM), random-access memory (RAM), magnetic disk storage media, optical storage media, flash-memory devices, and/or similar storage media. IP-CAN session storage 415 may store a record for each IP-CAN session known to the PCRN 400. As will be described in greater detail below, IP-CAN session storage 415 may also store records corresponding to "virtual IP-CAN sessions." Such virtual IP-CAN sessions may correspond to S9 subsessions. Exemplary contents of IP-CAN session storage will be described below with respect to FIG. 5.

Non-roaming message processor 420 may include hardware and/or executable instructions on a machine-readable storage medium configured to process various non-roaming messages a received from incoming message router 410. For example, non-roaming message processor may receive a request for a new IP-CAN session via network interface 405 and subsequently take steps to establish the new IP-CAN session including creating a new IP-CAN session record in IP-CAN session storage 415. Non-roaming message processor 420 may also be adapted to process other requests such as, for example, modification and termination requests associated with an IP-CAN session. Non-roaming message processor 420 may include a rules engine and may be generally adapted to handle the various Gx and Gxx messages described by the 3GPP. In various embodiments, non-roaming message processor 420 may further similarly process non-roaming messages translated from S9 messages by roaming message translator 435.

S9 interface 425 may be an interface comprising hardware and/or executable instructions encoded on a machine-readable storage medium configured to communicate with at least one partner device, such as another PCRN (not shown), according to the S9 protocol as described in 3GPP TS 29.215. In various embodiments, S9 interface 425 may be an Ethernet interface. S9 interface 425 may utilize the same hardware as network interface 405.

Roaming message processor 430 may include hardware and/or executable instructions on a machine-readable storage medium configured to process various S9 messages received via S9 interface 425. For example, roaming message processor 430 may be configured to establish and manage S9 sessions and subsessions with various partner devices. Roaming message processor 430 may further receive various Gx and Gxx message received via network interface 405 and associated with roaming subscribers. Roaming message processor 430 may process such messages to generate S9 messages for transmission to a partner device via S9 interface, according to 3GPP TS 29.215. Roaming message processor 430 may additionally or alternatively be configured to simply forward messages converted by non-roaming message translator 440 to an appropriate partner device via S9 interface 425.

Roaming message translator 435 may include hardware and/or executable instructions on a machine-readable storage medium configured to convert various S9 messages received via S9 interface 425 into one or more equivalent Gx and/or Gxx messages. For example, as described above with respect to FIG. 3, roaming message translator 435 may generate a Gx and/or Gxx message for each subsession AVP carried by an S9 message and may copy and/or translate various AVPs from the S9 message to the new Gx/Gxx messages. Various methods for translating S9 messages to corresponding Gx/Gxx messages will be apparent to those of skill in the art. After generating one or more Gx/Gxx messages, roaming message translator 420 may forward these messages to non-roaming message processor 420, either directly or via incoming message router 410.

Non-roaming message translator 440 may include hardware and/or executable instructions on a machine-readable storage medium configured to convert various Gx/Gxx messages into one or more equivalent S9 messages. For example, in a manner similar to that described above with respect to FIG. 3, non-roaming message translator 440 may generate an S9 message from one or more Gx/Gxx messages, including a subsession AVP for each Gx/Gxx message. Non-roaming message translator 440 may further convert and/or copy various AVPs from the Gx/Gxx messages into the new S9 message. Various methods for translating Gx/Gxx messages into a corresponding S9 message will be apparent to those of skill in the art. After generating one or more S9 messages, non-roaming message translator 440 may forward these messages to roaming message processor 440, either directly or via incoming message router 410.

In various embodiments, each S9 subsession may correspond to a virtual IP-CAN session stored in IP-CAN session storage 415. Thus, upon receiving a translated Gx/Gxx message from roaming message translator 435, non-roaming message processor 420 may perform normal processing with regard to the record for the virtual IP-CAN session. This record may further include a reference to PCRN 400 such that, when non-roaming message processor generates a response based on the processing of the translated Gx/Gxx message, non-roaming message processor 420 attempts to transmit the response to PCRN 400 itself. In various embodiments, PCRN 400 may actually transmit the message via network interface 405 and await the return of the response for further processing. In other embodiments, network interface 405 or another module (not shown) may be configured to identify the message within the message stack and remove the message for further processing prior to actually transmitting the message. Regardless, once the response is received, incoming message router 410 may be configured to pass the response to non-roaming message translator 440, such that the Gx/Gxx response may be translated to an S9 response for transmission to the partner device.

FIG. 5 illustrates an exemplary data arrangement 500 for storing IP-CAN session records. Data arrangement 500 may be, for example, a group of tables in a database stored in IP-CAN session storage 415 of PCRN 400. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include a number of fields such as IP-CAN session ID field 510, subscription identifiers field 520, and/or creation entity field 530. Data arrangement 500 may include numerous additional fields 540 useful in defining an IP-CAN session and processing messages associated therewith. IP-CAN session ID field 510 may store a unique identifier for each IP-CAN session. Subscription identifiers field 520 may store one or more subscription identifiers for a subscriber associated with the IP-CAN session. Creation entity field 530 may store an identification or address of an entity responsible for creating the IP-CAN session. Various communications regarding the IP-CAN session may be communicated to the entity stored in creation entity field 530.

As an example, IP-CAN session record 550 may be associated with IP-CAN session 0x12E1 and the subscriber having subscription identifiers a, b, and c. Further, IP-CAN session 0x12E1 may have been created by PGW 0x23. Thus, various communications such as messages installing PCC rules may be transmitted to PGW 0x23.

IP-CAN session record 560 may be an example of a record associated with a virtual IP-CAN session. IP-CAN session record 560 may be associated with a virtual IP-CAN session having the identifier 0xFF34 and a subscriber having subscription identifiers d and e. Because record 560 corresponds to a virtual IP-CAN session, record 560 may indicate that the virtual IP-CAN session was created by the home PCRN for the session. In various embodiments, this indication may simply include the enumerated value or keyword "SELF" or may include an actual identifier or address for the PCRN. Various methods for creating a reference to the PCRN will be apparent to those of skill in the art. Data arrangement 500 may include numerous additional records 570.

Figure 6:
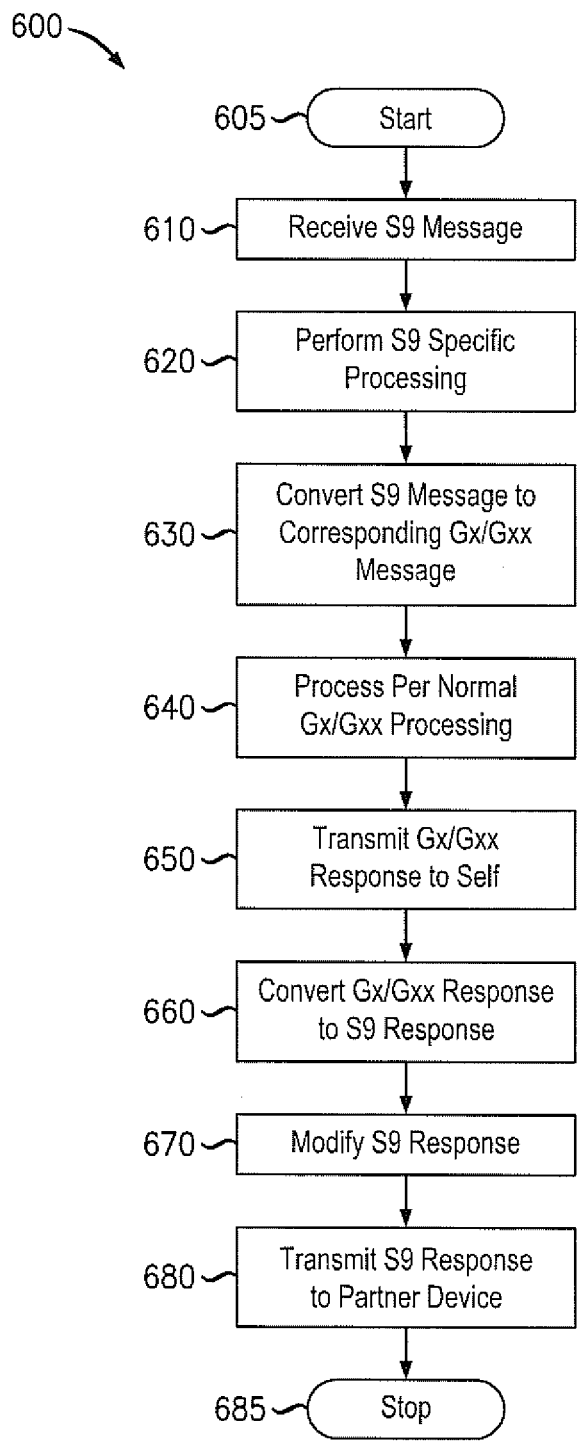
FIG. 6 illustrates and exemplary method for processing S9 messages.

FIG. 6 illustrates an exemplary method 600 for processing S9 messages. Method 600 may be performed by the components of PCRN 400 such as, for example, roaming message processor 430, roaming message translator 435, non-roaming message processor, and/or non-roaming message translator 430.

Method 600 may begin in step 605 and proceed to step 610 where the PCRN may receive an S9 message from a partner device. Then, in step 620, the PCRN may perform any processing specific to the S9 protocol. Various S9-specific processing will be apparent to those of skill in the art. Alternatively, the PCRN may not perform any S9-specific processing or may perform the S9-specific processing later in the method such as during step 670.

In step 630, the PCRN may convert the S9 message to one or more corresponding Gx/Gxx messages. Next, in step 640, the PCRN may process the converted message according to normal processing methods for Gx/Gxx messages. For some messages, the PCRN may generate a Gx/Gxx response message. If no Gx/Gxx response message is generated, then the method may simply end here. Otherwise, in step 650, based on normal Gx/Gxx processing and a virtual IP-CAN session associated with the Gx/Gxx messages, the PCRN may attempt to transmit the Gx/Gxx response to itself. Recognizing the receipt of such a message as a special case, the PCRN may proceed to translate the Gx/Gxx response into an S9 response message in step 660. In various embodiments, the PCRN may combine multiple Gx/Gxx responses into a single S9 response. Then the PCRN may modify the S9 response in step 670. For example, if some S9-specific response data is necessary or useful in view of S9-specific processing performed presently and/or in step 620, the PCRN may modify the S9 message to include this S9-specific response data as well. Various S9-specific processing and responses will be apparent to those of skill in the art. Finally, the PCRN may transmit the S9 response to the partner device in step 680 and method 600 may proceed to end in step 685.

According to the foregoing, various embodiments enable the integration of S9 and Gx/Gxx processing. In particular, by converting a received S9 message to one or more corresponding Gx/Gxx messages, the same modules normally employed in processing Gx/Gxx messages may be used to process the S9 message.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for integrating processing of roaming messages and non-roaming messages, the method comprising:
   receiving a roaming message at the network device from a partner device;
   translating the roaming message to generate a translated message formed according to a non-roaming protocol;
   processing the translated message to generate a response message;
   translating the response message to generate a translated response message formed according to a roaming protocol; and
   transmitting the translated response message by the network device to the partner device.

2. The method of claim 1, wherein the roaming protocol is an S9 Diameter protocol and the non-roaming protocol is at least one of a Gx Diameter protocol and a Gxx Diameter protocol.

3. The method of claim 1, wherein the step of translating the roaming message comprises:
 extracting a value from a first attribute-value pair (AVP) included in the roaming message;
 generating a second AVP including the extracted value, wherein the second AVP is of a different type from the first AVP; and
 including the second AVP in the translated message.

4. The method of claim 1, wherein the roaming message includes a subsession attribute-value pair (AVP) and the step of translating the roaming message comprises:
 extracting a first AVP included in the subsession AVP;
 extracting a second AVP included in the roaming message outside of the subsession AVP; and
 including the first AVP and the second AVP in the translated message.

5. The method of claim 1, wherein the roaming message includes a first subsession attribute-value pair (AVP) and a second subsession AVP, and the translated message is generated based on the first subsession AVP, the method further comprising:
 translating the roaming message to generate a second translated message formed according to a non-roaming protocol and based on the second subsession AVP; and
 processing the second translated message to generate a second response message.

6. The method of claim 1, wherein the translated message corresponds to a virtual IP-CAN session, and the step of processing the translated message comprises:
 attempting to transmit the response message based on an IP-CAN session record associated with the virtual IP-CAN session, wherein the IP-CAN session record indicates that the network device should transmit the response to itself.

7. The method of claim 1, wherein the step of translating the response message comprises:
 generating a first subsession attribute-value pair (AVP) based on the response message;
 generating a second subsession AVP based on a second response message; and
 generating a translated response message including the first subsession AVP and the second subsession AVP.

8. A network device for integrating processing of roaming messages and non-roaming messages, the network device comprising:
 an interface that receives a roaming message from a partner device;
 a roaming message translator configured to translate the roaming message to generate a translated message formed according to a non-roaming protocol;
 a non-roaming message processor configured to process the translated message to generate a response message;
 a non-roaming message translator configured to translate the response message to generate a translated response message formed according to a roaming protocol; and
 a roaming message processor configured to transmit the translated response message to the partner device.

9. The network device of claim 8, wherein, in translating the roaming message, the roaming message translator is configured to:
 extract a value from a first attribute-value pair (AVP) included in the roaming message;
 generate a second AVP including the extracted value, wherein the second AVP is of a different type from the first AVP; and
 include the second AVP in the translated message.

10. The network device of claim 8, wherein the roaming message includes a subsession attribute-value pair (AVP) and, in translating the roaming message, the roaming message translator is configured to:
 extract a first AVP included in the subsession AVP;
 extract a second AVP included in the roaming message outside of the subsession AVP; and
 include the first AVP and the second AVP in the translated message.

11. The network device of claim 8, wherein the roaming message includes a first subsession attribute-value pair (AVP) and a second subsession AVP, and the translated message is generated based on the first subsession AVP, and the roaming message translator is further configured to:
 translate the roaming message to generate a second translated message formed according to a non-roaming protocol and based on the second subsession AVP; and
 process the second translated message to generate a second response message.

12. The network device of claim 8, wherein the translated message corresponds to a virtual IP-CAN session, and, in processing the translated message, the non-roaming message processor is configured to:
 attempt to transmit the response message based on an IP-CAN session record associated with the virtual IP-CAN session, wherein the IP-CAN session record indicates that the network device should transmit the response to itself.

13. The network device of claim 8, wherein, in translating the response message, the non-roaming message translator is configured to:
 generate a first subsession attribute-value pair (AVP) based on the response message;
 generate a second subsession AVP based on a second response message; and
 generate a translated response message including the first subsession AVP and the second subsession AVP.

14. A tangible and non-transitory machine-readable storage medium encoded with instructions for execution by a network device for integrating processing of roaming messages and non-roaming messages, the tangible and non-transitory machine-readable storage medium comprising:
 instructions for receiving a roaming message at the network device from a partner device;
 instructions for translating the roaming message to generate a translated message formed according to a non-roaming protocol;
 instructions for processing the translated message to generate a response message;
 instructions for translating the response message to generate a translated response message formed according to a roaming protocol; and
 instructions for transmitting the translated response message by the network device to the partner device.

15. The tangible and non-transitory machine-readable storage medium of claim 14, wherein the roaming protocol is an S9 Diameter protocol and the non-roaming protocol is at least one of a Gx Diameter protocol and a Gxx Diameter protocol.

16. The tangible and non-transitory machine-readable storage medium of claim 14, wherein the instructions for translating the roaming message comprise:
 instructions for extracting a value from a first attribute-value pair (AVP) included in the roaming message;
 instructions for generating a second AVP including the extracted value, wherein the second AVP is of a different type from the first AVP; and instructions for including the second AVP in the translated message.

17. The tangible and non-transitory machine-readable storage medium of claim 14, wherein the roaming message includes a subsession attribute-value pair (AVP) and the instructions for translating the roaming message comprise:
- instructions for extracting a first AVP included in the subsession AVP;
- instructions for extracting a second AVP included in the roaming message outside of the subsession AVP; and
- instructions for including the first AVP and the second AVP in the translated message.

18. The tangible and non-transitory machine-readable storage medium of claim 14, wherein the roaming message includes a first subsession attribute-value pair (AVP) and a second subsession AVP, and the translated message is generated based on the first subsession AVP, the tangible and non-transitory machine-readable storage medium further comprising:
- instructions for translating the roaming message to generate a second translated message formed according to a non-roaming protocol and based on the second subsession AVP; and
- instructions for processing the second translated message to generate a second response message.

19. The tangible and non-transitory machine-readable storage medium of claim 14, wherein the translated message corresponds to a virtual IP-CAN session, and the instructions for processing the translated message comprise:
- instructions for attempting to transmit the response message based on an IP-CAN session record associated with the virtual IP-CAN session, wherein the IP-CAN session record indicates that the network device should transmit the response to itself.

20. The tangible and non-transitory machine-readable storage medium of claim 14, wherein the instructions for translating the response message comprise:
- instructions for generating a first subsession attribute-value pair (AVP) based on the response message;
- instructions for generating a second subsession AVP based on a second response message; and
- instructions for generating a translated response message including the first subsession AVP and the second subsession AVP.

* * * * *